Aug. 12, 1969     K. C. ALLISON     3,461,251

MULTIPOSITION ROTARY ELECTRIC SWITCH

Filed March 8, 1968     2 Sheets-Sheet 1

Inventor
Kenneth C. Allison
By Stanley Hook
Att'y

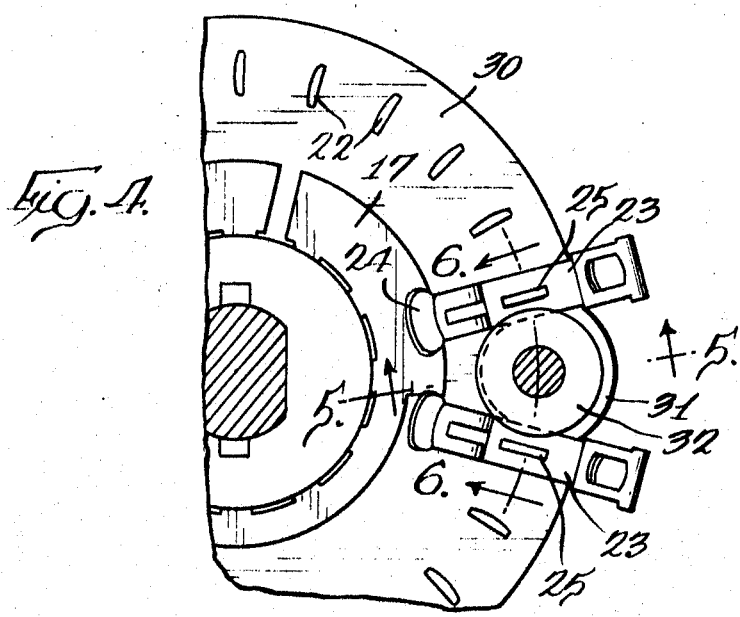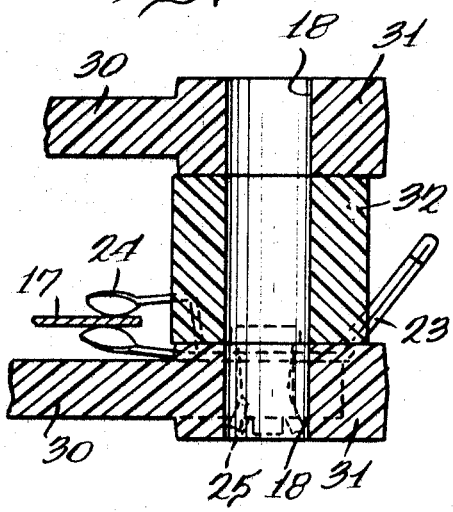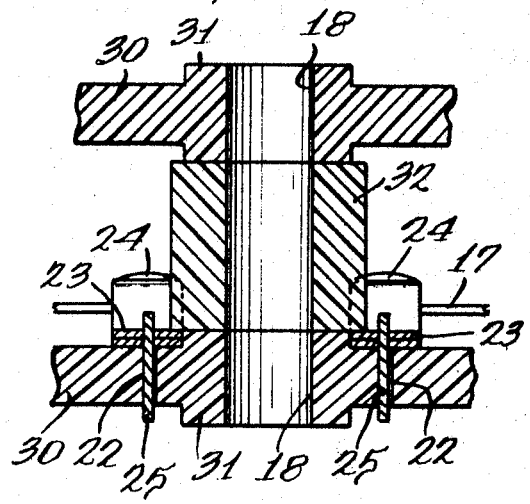

United States Patent Office 3,461,251
Patented Aug. 12, 1969

3,461,251
MULTIPOSITION ROTARY ELECTRIC SWITCH
Kenneth C. Allison, 1546 S. Shore Drive,
Crystal Lake, Ill. 60014
Filed Mar. 8, 1968, Ser. No. 711,647
Int. Cl. H01h 19/58, 21/78, 9/00
U.S. Cl. 200—11                                    2 Claims

ABSTRACT OF THE DISCLOSURE

A multisection multicontact rotary switch assembly as disclosed herein includes a molded stator body having contact members secured thereto via flat type rivets which have interfitting engagement with rivet receiving openings in the stator only when a plane drawn centrally of the faces of the rivet coincides with a plane containing the axis of the stator and extending radially of the stator. Strut mounting openings at diametrically opposed areas of the stator within the confines of a continuous circular band like area containing the rivet accepting openings each is bordered by an insulating collar formed integrally with the stator. The wall portions of said collars measured circumferentially of said band like area is greater than the distance between said collar and either of the rivet receiving openings flanking the collar.

---

This invention relates to a multiposition rotary switch section for use in a multi-section switch assembly wherein two or more like rotary switch sections occupy fixed spaced apart positions axially of a rotor operating shaft by means of strut members received in aligned strut mounting openings provided in the stator body of each switch section at 180 degrees apart locations and an insulating spacer encompasses the length of the strut member within the area between the switch sections joined thereby.

More specifically it relates to a molded switch section wherein each insulating spacer is defined by a collar formed integrally with a molded stator body. The thickness of the wall portions of said collar which face in the direction of the stator contacts which flank the area occupied by the collar has been restricted in former switch sections of this type in order to provide needed space for occupancy by said stator contacts compatible with providing a maximum number of spaced apart stator contact occupying areas along the path of the rotor contact. Limited thickness of said wall portions of the spacer collar, particularly in switch sections of miniaturized components, has made it difficult to maintain efficient functioning of the switch section because of lack of adequate insulation provided by spacer collar walls of undersized thickness and also due to susceptibility to breakage under impacts encountered in assembly operations with consequent loss of insulation resulting from such imperfections in the structure of the collar.

In accordance with a switch section embodying the present invention, the areas occupied by the stator contact members are established by rivet accepting openings of such limited size measured circumferentially of the stator as to allow reduction of the corresponding dimension of the space required by the stator contact at opposite sides of the rivet accepting opening. The space thus made available between the strut receiving opening and the stator contacts in immediate flanking relation thereto permits use of molded integral spacer collars of sufficient wall thickness to overcome the structural weakness heretofore encountered in molded stators of this type as well as to provide adequate insulation between each strut member and the contacts flanking the collar encompassing such strut member.

Another advantageous feature of this invention resides in the use of rivet accepting openings of elongated configuration radially of the stator which have interfitting relation with a flat rivet with opposite flat faces of said rivet occupying a position wherein a line drawn centrally of said faces coincides with a line drawn radially of the rotary path of the rotor, when said rivet and the contact member associated therewith are in secured position relative to a rivet accepting opening containing said rivet. Owing to the use of high speed mechanized assembly procedures in the commercial production of switches of this type, as distinguished from manual assembly operations, it is mandatory to provide for the location of the stator contacts in precise radially extending relation to the axis of the rotor since the mechanism by which the components are fed to the assembly stations will not allow any variation from such location of the stator contacts. Accordingly control of proper radial alignment of the stator contacts which is achieved by the configuration of the rivet and receiving openings for the rivets as provided in a rotary switch section embodying the present invention eliminates the need for ribs or recesses as heretofore required in molded switch sections using conventional cylindrical eyelets as stator contact fastening means.

With these and other objects in vew, the invention consists in the construction, arrangement and combination of parts of a switch section whereby the objects contemplated are attained, as hereinafter set forth, pointed out in the appended claims and illustrated in the accompanying drawings wherein:

FIG. 4 is a fragmentary plan view of a modified version of a multiposition rotary switch section for use in a multisection switch in accordance with the present invention.

FIG. 5 is a cross-sectional view taken along line 5—5 of FIG. 4.

FIG. 6 is a cross-sectional view taken along line 6—6 of FIG. 4.

Figure 1:
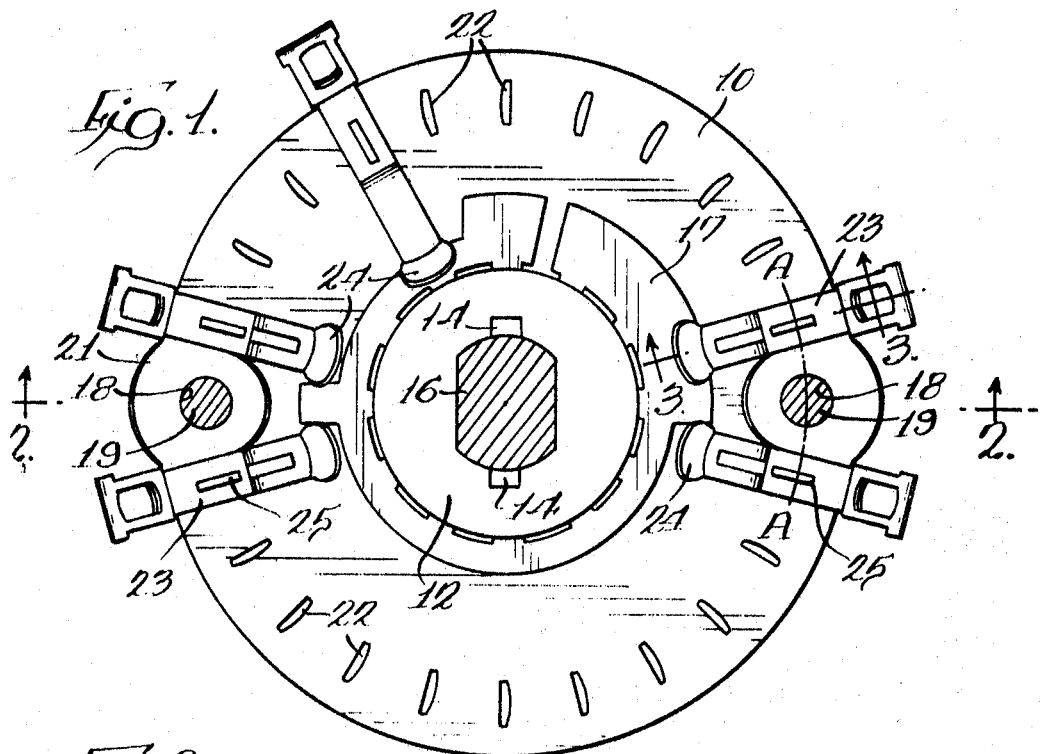
FIG. 1 is is a plan view of a multiposition rotary switch section for use in a multisection switch embodying spacer collars for encompassing strut members in accordance with the present invention.
Figure 2:
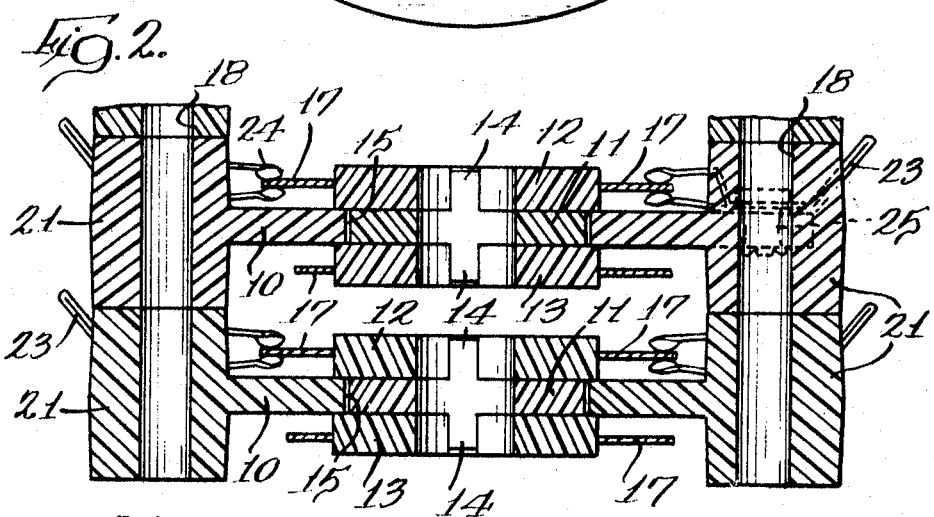
FIG. 2 is a cross-sectional view taken along line 2—2 of FIG. 1.
Figure 3:
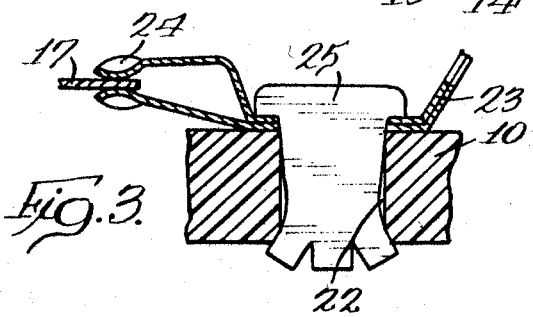
FIG. 3 is an enlarged fragmentary section taken along line 3—3 of FIG. 1.

Referring more particularly to the drawings, the stator comprises an annular wafer 10 of molded insulating material such as diallyl phthalate and a rotor comprising a hub member 11 to which a pair of insuating disks 12 and 13 are secured by axially extending fastening fingers 14 formed integrally with the hub member 11 while the latter is sandwiched between said disks 12 and 13. The hub member 11 occupies a position within the confines of a central rotor receiving opening in the stator 10 and the edge 15 of said opening in the stator provides a bearing surface against which the edge of the hub member 11 opposite thereto has sliding engagement while the hub member 11 and the disks 12 and 13 are rotated as a unit by means of a rotor operating shaft 16 which is keyed to the hub member 11 and disks 12 and 13 via aligned slots 16 which receive and fit the shaft. The surfaces of the disks 12 and 13 facing the rotor hub 11 overlap the surfaces of the stator bordering the edges 15 of the opening occupied by the rotor hub 11. Thus the disks 12 and 13 rotate in fixed parallel planes established by the opposite surfaces of the stator 10 overlapped thereby. Contact blades 17 embedded in the disks 12 and 13 and projecting from the peripheral edges of the disks 12 and 13 associated therewith are likewise moved in fixed planes offset axially from the surface of the stator opposite thereto.

A pair of like openings 18 formed in the stator 10 are at 180 degree apart locations circumferentially of a band-like area concentric with the path of rotation of the rotor and bodering the outer edge of the stator 10. Each opening 18 receives a strut member such as a cylindrical rod 19 which likewise passes through a similar one of a pair of such openings provided in a second switch section of like construction to form a multisection switch assembly as contemplated by this invention. An insulating spacer encompassing the length of the strut member 20 in accordance with the desired spacing between said switch sections is defined by a collar 21 formed integrally with the stator 10 in axial alignment with said openings 18.

Areas available for occupancy by stator contact members while separated by an interval corresopnding to one operative step in the travel of the rotor contacts, are established by a series of rivet accepting openings 22 formed in the stator 10. Each opening 22 is of elongated configuration with opposite edges thereof defining its dimension radially of the stator coincident with the innermost and outermost boundries of the band like area in which the strut mounting openings 18 are located, and said openings 22 are spaced at equal distances apart circumferentially of said band like area throughout an arc of 360 degrees except for the areas occupied by the strut receiving openings 18.

Each stator contact, designated generally by reference numeral 23, consists of a metal strip arranged radially of the switch section and is formed with a spoon-shaped inner end 24 to engage with corresponding contacts 17 secured to a rotor disk opposite thereto. Each stator contact 23 is fixed to the stator by means of a rivet 25 which fits a rectangular shaped opening in the stator contact 23 as well as a selected rivet accepting opening 22 in the stator in registry therewith. It will be noted that the rivet 25 has opposed flat faces which are at such distance apart as to allow the rivet to have interfitting relation with the opening 22 occupied thereby only when said flat faces of the rivet occupy a position wherein a line drawn centrally of said faces coincides with a line drawn radially of the axis of the rotor. Thus the rivet, like the opening 22 in the stator and the opening in the contact 23 associated therewith is of substantially smaller dimension measured circumferentially of the band like area occupied by the rivet accepting openings 22 and the strut mounting openings 18 in the stator in relation to its dimension measured along a line through said band like area drawn radially of the axis of the rotor. As a consequence, the space required by the stator contacts 23 flanking the spacer collars 21 is of such limited dimension measured circumferentially of said band like area in comparison with the space need by stator contacts which are secured to the stator by means of more conventional round eyelet fasteners that the wall thickness of opposite portions of the spacer collar along a measurement line A—A (see FIG. 1) is increased to assure adequate insulation between the stator contacts 23 nearest the spacer collar 21 and the strut member encompassed by said collar as well as to provide added resistance to breakage under impacts encountered in switch assembly operations. As shown clearly in FIG. 1, such opposite wall portions of the collars 21 are of uniform thickness along said measurement line A—A. It will also be observed that each of said rivet accepting openings 22 in nearest flanking relation to a strut mounting opening is separated from the nearest wall portions of the collar 21 along said measurement line by a distance less than the thickness of the collar 21 measured along said line A—A.

In the modified construction shown in FIGS. 4, 5 and 6 of the drawings, a stator 30 is provided with a spacer collar 31 having its axial dimension so limited as to present its exposed end surfaces in a plane perpendicular to the axis of the rotor and coincident with a plane containing the exposed facial surface of a stator contact which occupies a position alongside the spacer collar and in alignment with the band like area containing the rivet receiving openings. With this arrangement, desired spacing between each stator 30 and a stator in axially paired relation therewith via a strut in each of the strut mounting openings of said stators is obtained by means of an auxiliary collar 32 of such size measured circumferentially of the band like area containing the rivet accepting openings as to be engaged in part with the end surfaces of the spacer collar 31 of the axially paired stators 30 and in part with said exposed facial surface portions of the stator contact members nearest thereto. Accordingly the collar 32, as shown in FIGS. 4, 5 and 6, in conjunction with the collar 31 of axially paired stators 30 provides additional insulation between a strut member confined within the collar 32 and the collars 31 and the contact members of the stator which flank said collars. Furthermore, this construction and assembly affords a more stable structure which is resistant to excessive vibration which bring about malfunctioning in switch assemblies of more conventional design.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A multiposition rotary switch section for use in a multi-section switch, said section including a stator of molded insulating material having a central opening, a rotor mounted in said central opening for rotation peripherally of said opening about a fixed axis, a contact secured to said rotor, said stator having a circular band like area of uniform radial width encircling the position occupied by said rotor, a pair of like strut mounting openings in said stator occupying 180 degree apart positions circumferentially of said band like area, means establishing positions on said stator for occupancy by stator contact members, said means including a series of like rivet accepting openings uniformly spaced apart circumferentially so said band like area throughout an arc of 360 degrees except for the areas occupied by said strut mounting openings, each of said rivet accepting openings being of elongated configuration and having the longest dimension thereof defined by edge portions coincident with the innermost and outermost limits of said band like area, each of said strut mounting openings having an insulating spacer associated therewith encompassing a strut member when the latter occupies said strut mounting opening, each spacer including a collar formed integrally with the stator, said collars each having opposite wall portions of uniform thickness along a measurement line extending circumferentially of said band like area and bisecting the rivet accepting openings, said rivet accepting openings in nearest flanking relation to each of said collars being separated from the nearest outer surface of said wall portions of the collar by a distance less than the thickness of said opposite wall portions of the collar, and stator contacts selectively engageable by said rotor contact, each of said stator contacts being secured to said stator by means of a rivet having opposed flat faces at such distance apart as to have interfitting relation with a seleced elongated rivet accepting opening occupied by said rivet only when said flat faces of the rivet occupy a position wherein a line drawn centrally of said flat faces of the rivet coincides with a line drawn radially of the axis of the rotor.

2. A multiposition rotary switch section for use in a multi-section switch according to claim 1 wherein each of said collars presents a flat axially facing end surface in a plane perpendicular to the axis of the rotor, and each contact member secured to said stator nearest said collar has an exposed facial portion in circumferential alignment with said band like area which is coplanar with said end surface of the collar, and means operative to establish selected spacing between said stator and the stator of a like switch section axially paired therewith via a strut in each of the strut mounting openings of said stators includes an auxiliary collar of such size as to be engaged in part with the end surfaces of the collars formed integrally with the axially paired stators and in part with said exposed facial portions of the stator contact members nearest thereto.

References Cited

UNITED STATES PATENTS

| | | |
|---|---|---|
| 3,171,906 | 3/1965 | Allison. |
| 3,213,211 | 10/1965 | Allison. |
| 3,308,248 | 3/1967 | Stephan et al. |

ROBERT K. SCHAEFER, Primary Examiner

J. R SCOTT, Assistant Examiner

U.S. Cl. X.R.

200—166